(12) United States Patent
Wu (10) Patent No.: US 11,073,941 B1
(45) Date of Patent: Jul. 27, 2021

(54) DRIVING DEVICE AND OPERATION METHOD THEREOF

(71) Applicant: HIMAX TECHNOLOGIES LIMITED, Tainan (TW)

(72) Inventor: Ilin Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/858,725

(22) Filed: Apr. 27, 2020

(51) Int. Cl.
  *G06F 3/041* (2006.01)
  *G09G 3/3225* (2016.01)
  *G09G 3/3275* (2016.01)

(52) U.S. Cl.
  CPC ........ *G06F 3/04166* (2019.05); *G06F 3/0418* (2013.01); *G09G 3/3225* (2013.01); *G09G 3/3275* (2013.01); *G09G 2320/02* (2013.01)

(58) Field of Classification Search
  CPC .. G06F 3/04166; G06F 3/0418; G06F 3/0412; G09G 3/3225; G09G 3/3275; G09G 2320/02
  See application file for complete search history.

(56) References Cited

U.S. PATENT DOCUMENTS

| | | | |
|---|---|---|---|
| 9,569,035 B1* | 2/2017 | Lee | G06F 3/04182 |
| 10,372,244 B2 | 8/2019 | Jung et al. | |
| 10,474,281 B2 | 11/2019 | Park et al. | |
| 2014/0160058 A1* | 6/2014 | Chen | G06F 3/044 345/174 |
| 2017/0031524 A1* | 2/2017 | Shin | G06F 3/0443 |
| 2017/0038898 A1* | 2/2017 | Kim | G09G 3/3233 |
| 2017/0199616 A1* | 7/2017 | Kim | G09G 3/3266 |
| 2018/0113531 A1* | 4/2018 | Na | G06F 3/0412 |
| 2019/0094590 A1* | 3/2019 | Aoki | G06F 3/0443 |
| 2019/0157356 A1* | 5/2019 | Li | G06F 3/0416 |
| 2019/0310729 A1* | 10/2019 | Kimura | G02F 1/134309 |

FOREIGN PATENT DOCUMENTS

| | | |
|---|---|---|
| CN | 103354078 | 10/2013 |
| CN | 103383837 | 11/2013 |
| CN | 106409218 | 2/2017 |
| TW | 201712498 | 4/2017 |
| WO | 2015027584 | 3/2015 |

OTHER PUBLICATIONS

"Office Action of Taiwan Counterpart Application", dated Dec. 30, 2020, p. 1-p. 6.
Office Action of Taiwan Counterpart Application, dated Apr. 30, 2021, pp. 1-6.

* cited by examiner

*Primary Examiner* — Michael Pervan
(74) *Attorney, Agent, or Firm* — JCIPRNET (57) ABSTRACT

A driving device and an operation method thereof are provided. The driving device is configured to drive a self-emissive display panel (e.g., an organic light emitting diode (OLED) display panel). The self-emissive display panel is an in-cell touch panel. The driving device includes a driving circuit and a control circuit. The driving circuit is configured to drive a plurality of pixel circuits of the self-emissive display panel during a first sub-period of a frame period to display an image frame. The control circuit is configured to control the driving circuit to set the pixel circuits not to emit light during a second sub-period of the same frame period. The control circuit performs a touch detection operation on the self-emissive display panel during the same second sub-period.

10 Claims, 6 Drawing Sheets

DRIVING DEVICE AND OPERATION METHOD THEREOF

BACKGROUND

Technical Field

The disclosure related to a display apparatus, and more particularly, to a driving device and an operation method thereof.

Description of Related Art

In the trend of product development, organic light emitting diode (OLED) display panels are configured to integrate the display function and touch function with an aim to reduce the volume of display apparatuses When a touch detection operation is performed, how to prevent the touch detection operation from affecting the visual effect generated by an OLED display panel (or other self-emissive display panels) is an important issue in this field.

SUMMARY

The disclosure provides a driving device and an operation method thereof through which a visual effect of a self-emissive display panel is not affected as much as possible when a touch detection operation is performed on the self-emissive display panel.

In an embodiment of the disclosure, the driving device is configured to drive a self-emissive display panel. The self-emissive display panel is an in-cell touch panel. The driving device includes a driving circuit and a control circuit. The driving circuit is configured to drive a plurality of pixel circuits of the self-emissive display panel during a first sub-period of a frame period to display an image frame. The control circuit is configured to control the driving circuit to set the pixel circuits not to emit light during a second sub-period of the frame period. Herein, the control circuit performs a touch detection operation on the self-emissive display panel during the second sub-period.

In an embodiment of the disclosure, the operation method includes the following steps. A plurality of pixel circuits of a self-emissive display panel are driven during a first sub-period of a frame period by a driving circuit to display an image frame. The driving circuit is controlled by a control circuit to set the pixel circuits not to emit light during a second sub-period of the frame period. A touch detection operation is performed on the self-emissive display panel by the control circuit during the second sub-period.

Based on the above, in the driving device and the operation method thereof provided by the embodiments of the disclosure, one frame period is at least divided into the first sub-period and the second sub-period. In the first sub-period and the second sub-period of the same frame period, the driving device respectively performs the displaying and driving operation and the touch detection operation on the self-emissive display panel. Herein, the driving circuit sets these pixel circuits of the self-emissive display panel not to emit light during the second sub-period. In this way, when the touch detection operation is performed on the self-emissive display panel, the visual effect of the self-emissive display panel may not be affected as much as possible.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The term "coupled to (or connected to)" used in the entire disclosure (including claims) refers to any direct or indirect connecting means. For example, if the disclosure describes a first apparatus is coupled to (or connected to) a second apparatus, the description should be explained as the first apparatus that is connected directly to the second apparatus, or the first apparatus, through connecting other apparatus or using certain connecting means, is connected indirectly to the second apparatus. In addition, terms such as "first" and "second" in the entire specification (including claims) are used only to name the elements or to distinguish different embodiments or scopes and should not be construed as the upper limit or lower limit of the number of any element and should not be construed to limit the order of the elements.

Moreover, elements/components/steps with the same reference numerals represent the same or similar parts in the figures and embodiments where appropriate. Descriptions of the elements/components/steps with the same reference numerals or terms in different embodiments may be references for one another.

Figure 1:
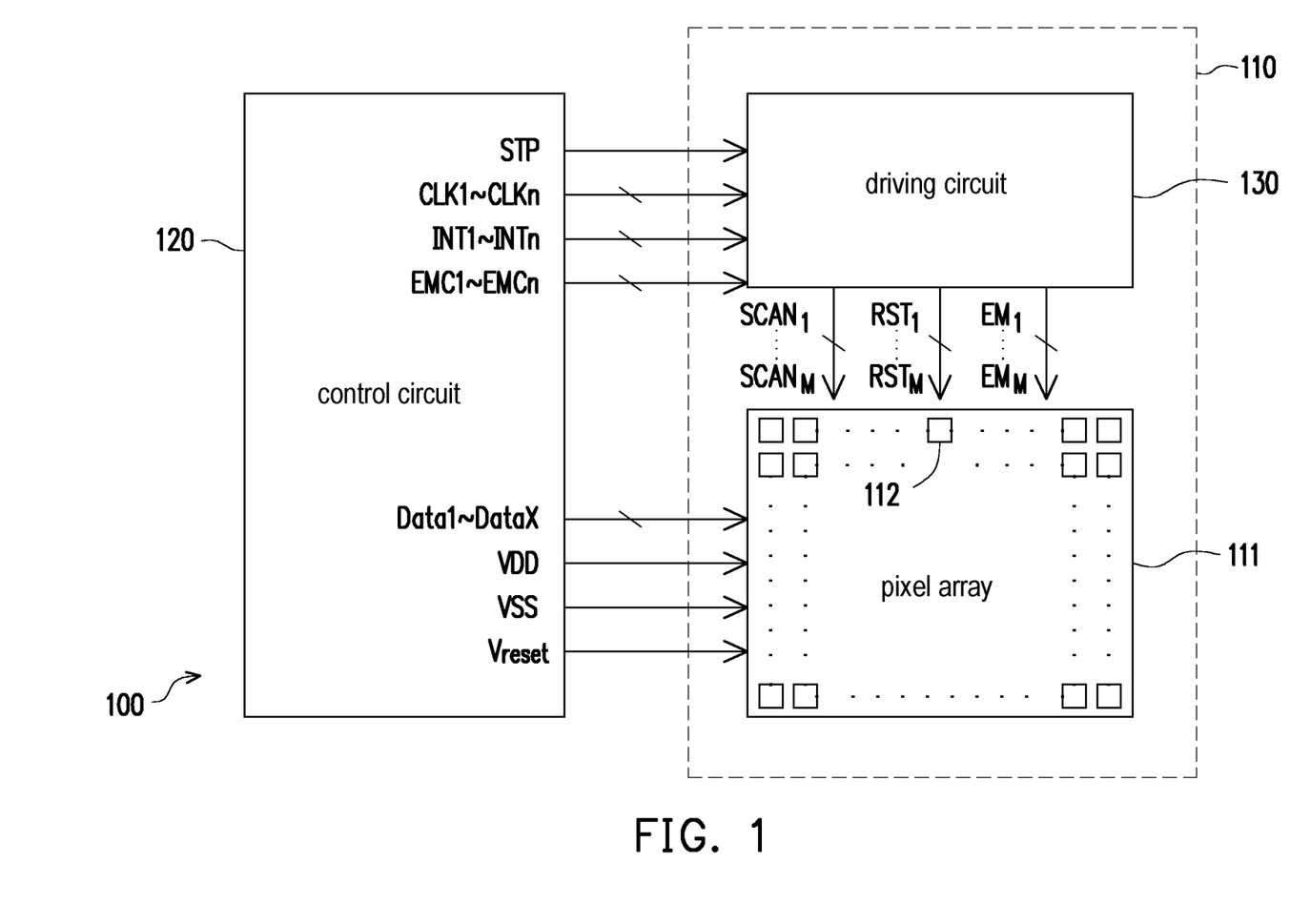
FIG. 1 is a schematic diagram illustrating circuit blocks of a display apparatus according to an embodiment of the disclosure.

FIG. 1 is a schematic diagram illustrating circuit blocks of a display apparatus 100 according to an embodiment of the disclosure. The display apparatus 100 includes a self-emissive display panel 110 and a driving device. The self-emissive display panel 110 includes a pixel array 111 including a plurality of pixel circuits 112. The pixel array 111 has a number of M horizontal lines (or horizontal display lines) and M horizontal lines mean that M pixel circuit rows are provided. Each one of the pixel circuits 112 has a light emitting element, so that the self-emissive display panel 110 may display an image frame without the need of backlight. For instance, according to design needs, the self-emissive display panel 110 may include an organic light emitting diode (OLED) display panel, a micro LED display panel, or a self-emissive display panel of another type (i.e., a display panel without the need of backlight). For instance, the above-mentioned OLED display panel may be an active matrix OLED (AMOLED) display panel.

In the embodiments represented by FIG. 1, the driving device configured to drive the self-emissive display panel 110 includes a control circuit 120 and a driving circuit 130. In the embodiments represented by FIG. 1, the driving circuit 130 may be disposed on the self-emissive display panel 110. For instance, the driving circuit 130 may be a gate on array (GOA) circuit. According to design needs, in other embodiments, the driving circuit 130 may also be disposed on a flexible circuit board, a printed circuit board, or other positions. When being controlled by the control circuit 120, the driving circuit 130 may drive these pixel circuits 112 of the self-emissive display panel 110 during a first sub-period (a displaying and driving period) of a frame period to display an image frame.

The control circuit 120 may provide a signal to the driving circuit 130 (or called as a GOA circuit) to control the driving circuit. For instance, the control circuit 120 may provide a start pulse signal STP and a clock signal (e.g., gate clock signals CLK1 to CLKn having different phases, initialization clock signals INT1 to INTn having different phases, and emissive clock signals EMC1 to EMCn having different phases). According to the start pulse signal STP and the gate clock signals CLK1 to CLKn provided by the control circuit 120, the driving circuit 130 may generate a plurality of gate scanning signals $SCAN_1$ to $SCAN_M$ for the self-emissive display panel 110. According to the start pulse signal STP and the initialization clock signals INT1 to INTn provided by the control circuit 120, the driving circuit 130 may generate a plurality of reset scanning signals $RST_1$ to $RST_M$ for the self-emissive display panel 110. According to the start pulse signal STP and the emissive clock signals EMC1 to EMCn provided by the control circuit 120, the driving circuit 130 may generate a plurality of emissive scanning signals $EM_1$ to $EM_M$ for the self-emissive display panel 110. The gate scanning signals $SCAN_1$ to $SCAN_M$, the reset scanning signals $RST_1$ to $RST_M$, and the emissive scanning signals $EM_1$ to $EM_M$ may be generated by a shift register circuit in the driving circuit 130. On the other hand, the control circuit 120 may provide the pixel array 111 of the self-emissive display panel 110 with data voltages (i.e., pixel voltages, e.g., data voltages Data1 to DataX) corresponding to a plurality of output channels of the control circuit 120. In addition, the control circuit 120 may further provide a system voltage VDD, a reference voltage VSS, and a reset voltage Vreset to the self-emissive display panel 110.

Figure 2:
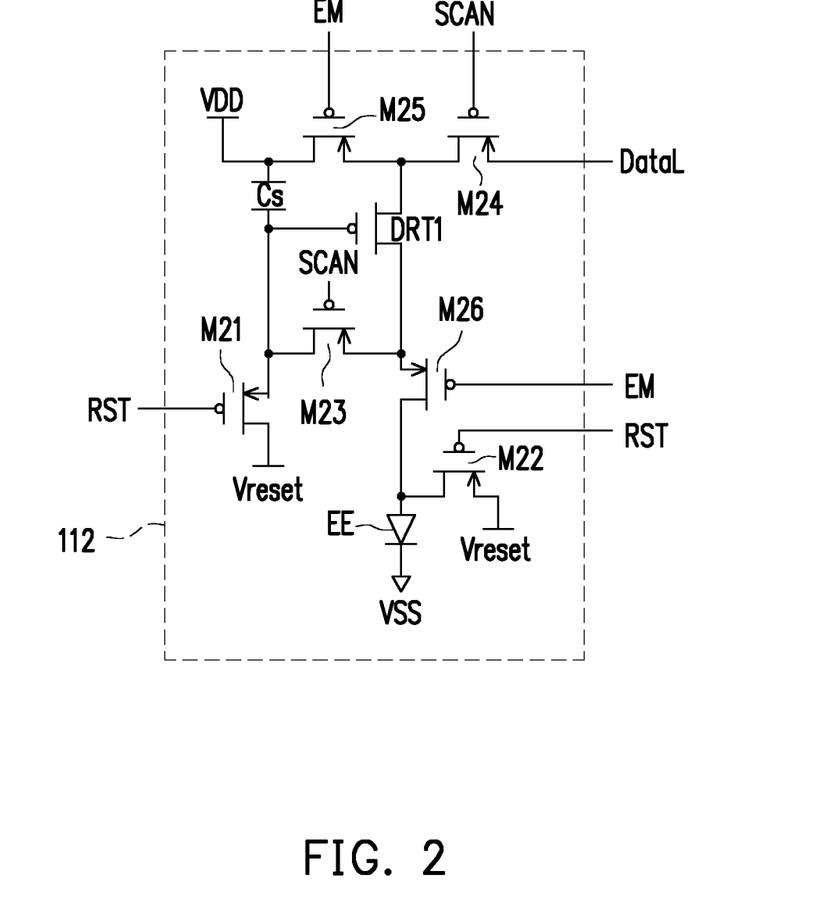
FIG. 2 is a schematic diagram of a circuit among pixel circuits shown in FIG. 1 according to an embodiment.

FIG. 2 is a schematic diagram of a circuit among the pixel circuits 112 shown in FIG. 1 according to an embodiment. The pixel circuit 112 in FIG. 2 includes a switch M21, a switch M22, a switch M23, a switch M24, a switch M25, a switch, M26, a transistor DRT1, a storage capacitor Cs, and a light emitting element EE (e.g., OLED). The switch M21, the switch M22, the switch M23, the switch M24, the switch M25, the switch M26, and the transistor DRT1 may be p-channel type (p-type) thin film transistors (TFT).

With reference to FIG. 1 and FIG. 2, the switch M21 and the switch M22 are controlled by a reset scanning signal RST, and the reset scanning signal RST may be one of the reset scanning signals $RST_1$ to $RST_M$. The switch M23 and the switch M24 are controlled by a gate scanning signal SCAN, and the gate scanning signal SCAN may be one of the gate driving signals $SCAN_1$ to $SCAN_M$. The switch M25 and the switch M26 are controlled by an emissive scanning signal EM, and the emissive scanning signal EM may be one of the emissive scanning signals $EM_1$ to $EM_M$. Based on control performed by the reset scanning signal RST, the gate scanning signal SCAN, and the emissive scanning signal EM, a data voltage (one of the data voltages Data1 to DataX) of a data line DataL may be written into the storage capacitor Cs.

Figure 3:
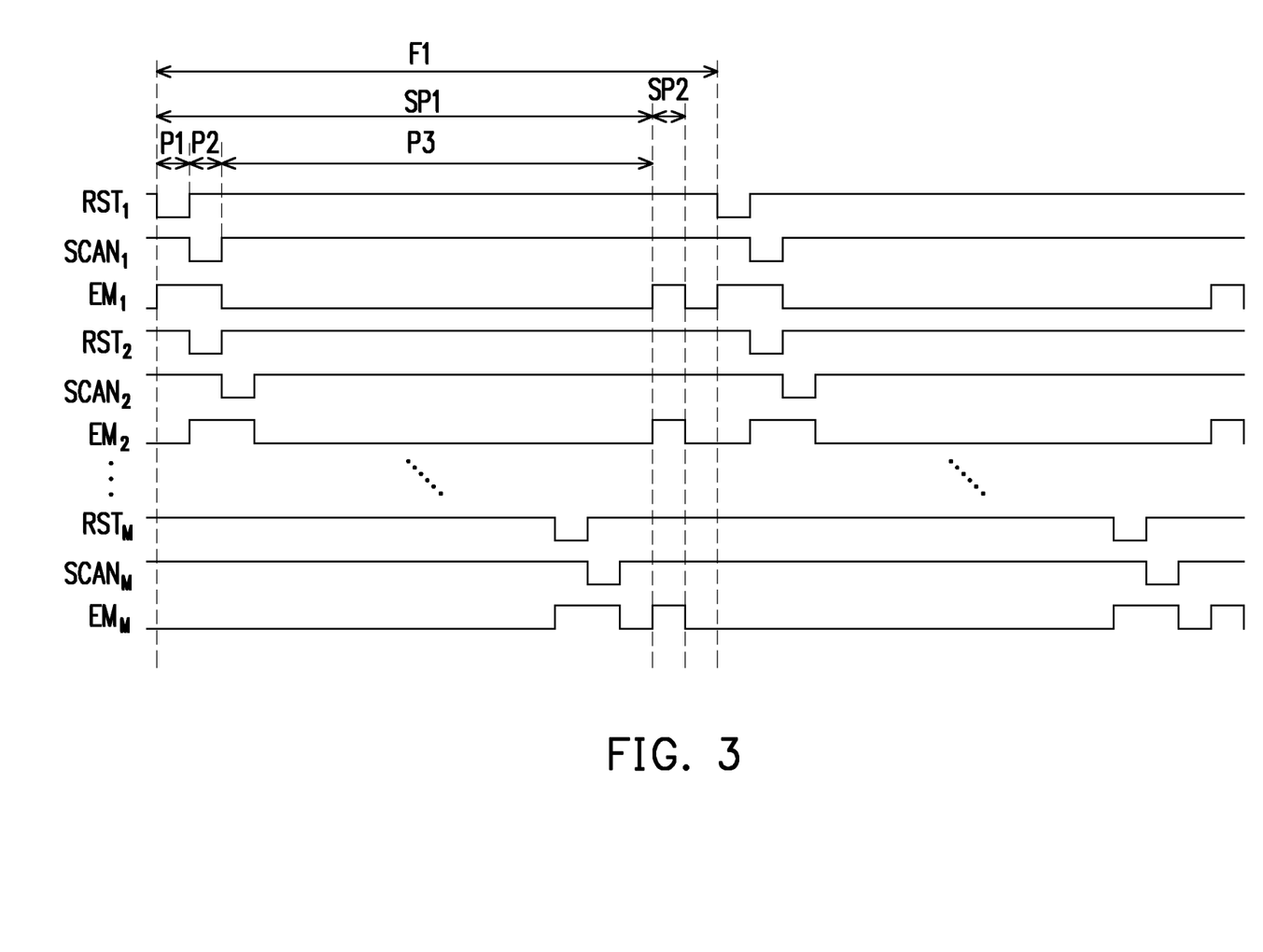
FIG. 3 is a schematic diagram of signal timing of a self-emissive display panel shown in FIG. 1 according to an embodiment of the disclosure.

FIG. 3 is a schematic diagram of signal timing of the self-emissive display panel 110 shown in FIG. 1 according to an embodiment of the disclosure. As shown in FIG. 3, one frame period F1 may at least be divided into a first sub-period SP1 and a second sub-period SP2. When being controlled by the control circuit 120, the driving circuit 130 may perform a displaying and driving operation during the first sub-period SP1, that is, may drive these pixel circuits 112 of the self-emissive display panel 110 to display an image frame.

For the sake of description, it is assumed herein that the reset scanning signal RST shown in FIG. 2 may be the reset scanning signal $RST_1$ shown in FIG. 3, the gate scanning signal SCAN shown in FIG. 2 may be the gate scanning signal $SCAN_1$ shown in FIG. 3, and the emissive scanning signal EM shown in FIG. 2 may be the emissive scanning signal $EM_1$ shown in FIG. 3. Description of the reset scanning signals $RST_2$ to $RST_M$, the gate scanning signals $SCAN_2$ to $SCAN_M$, and the emissive scanning signals $EM_2$ to $EM_M$ shown in FIG. 3 may be deduced by analogy with reference to the description related to the reset scanning signal $RST_1$, the gate scanning signal $SCAN_1$, and the emissive scanning signal $EM_1$, so such description is not repeated herein.

With reference to FIG. 1, FIG. 2, and FIG. 3, a driving solution of the pixel circuit 112 may be divided into three stages: a reset (initialization) stage, a data writing stage, and a light emitting stage. During a period P1 (a reset stage), the reset scanning signal RST (e.g., $RST_1$) may turn on the switch M21 and the switch M22 of the pixel circuit 112, so that the reset voltage Vreset may be sent to the storage capacitor Cs and the light emitting element EE. The reset voltage Vreset may be a constant voltage. The reset voltage Vreset may turn on the transistor DRT1 through the switch M21. During the period P1, the switch M23, the switch M24, the switch M25, and the switch M26 are turned off. During a period P2 (a data writing stage), the gate scanning signal SCAN (e.g., $SCAN_1$) may turn on the switch M23 and the switch M24 of the pixel circuit 112 (the switch M21, the switch M22, the switch M25, and the switch M26 are turned off at the moment). In this way, the data voltage (one of the data voltages Data1 to DataX) of the data line DataL may be stored in the storage capacitor Cs through the switch M24, the transistor DRT1, and the switch M23. During a period P3 (a light emitting stage), the emissive scanning signal EM (e.g., $EM_1$) may turn on the switch M25 and the switch M26 of the pixel circuit 112 (the switch M21, the switch M22, the switch M23, and the switch M24 are turned off at the moment). In this way, the switch M25, the transistor DRT1, and the switch M26 may provide a current path, and such current path may provide a driving current to the light emitting element EE. The data voltage stored in the storage capacitor Cs may control the transistor DRT1 to determine the driving current. The driving current passes through the light emitting element EE, so that the light emitting element EE may emit light having a corresponding luminance (gray scale).

The self-emissive display panel 110 is an in-cell touch panel. The control circuit 120 may perform a touch detection operation on the self-emissive display panel 110 during the second sub-period SP2 of the frame period F1. For instance, during the second sub-period SP2, a system voltage line (a conductive line configure to send the system voltage VDD, not shown in FIG. 1) of the pixel array 111 may be configured to act as a transmit (generally referred to as TX) electrode of the touch detection operation, and a reference voltage line (a conductive line configure to send the reference voltage VSS, not shown in FIG. 1) of the pixel array 111 may be configured to act as a receive (generally referred to as RX) electrode of the touch detection operation. In some other embodiments, the system voltage line of the pixel array 111 may be configured to act as the RX electrode of the touch detection operation, and the reference voltage line of the pixel array 111 may be configured to act as the TX electrode of the touch detection operation. When the touch detection operation is performed, the control circuit 120 changes the system voltage line of the pixel array 111 and/or a voltage of the reference voltage line.

Since the light emitting element EE (e.g., OLED) has a quick response time, when the system voltage line of the pixel array 111 and/or the voltage of the reference voltage line are/is changed, the luminance (gray scale) emitted by the light emitting element EE may change considerably. The driving circuit 130 may set all pixel circuits 112 of the self-emissive display panel 110 not to emit light during the second sub-period SP2 (the period when the touch detection operation is performed), so that an visual effect of the self-emissive display panel 110 may not be affected as much as possible when the self-emissive display panel 110 performs the touch detection operation.

Figure 4:
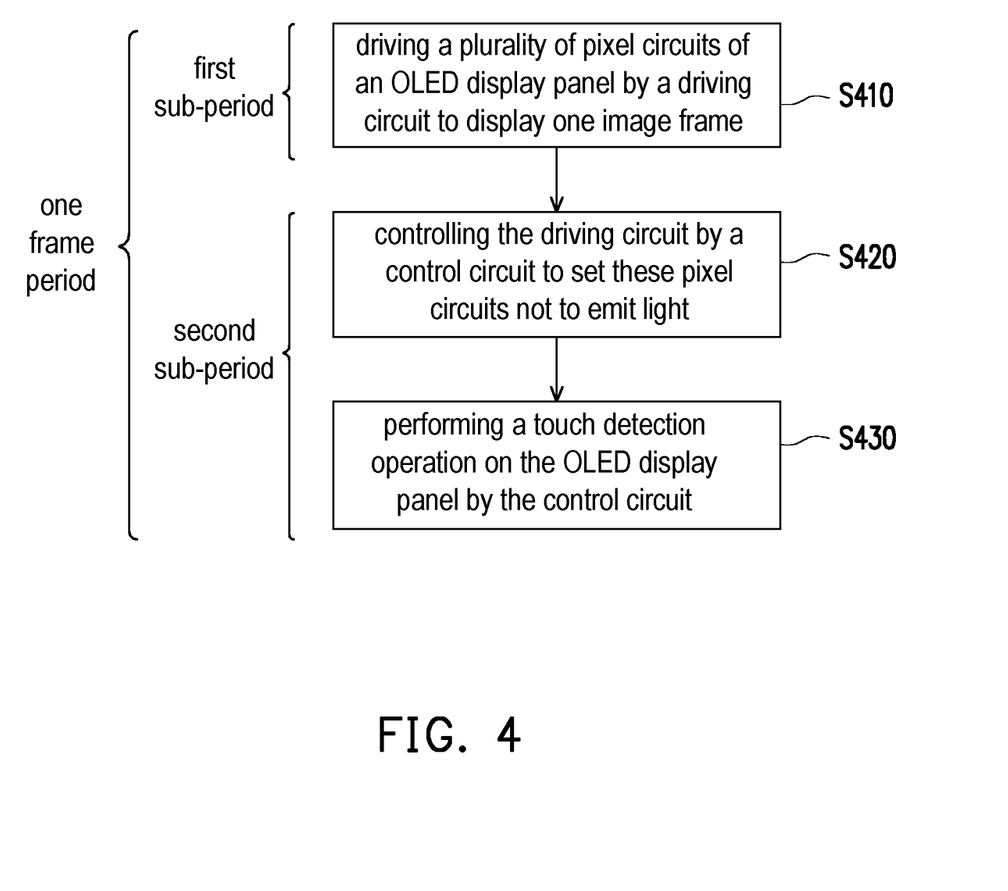
FIG. 4 is a schematic flow chart illustrating an operation method of a display apparatus according to an embodiment of the disclosure.

FIG. 4 is a schematic flow chart illustrating an operation method of a display apparatus according to an embodiment of the disclosure. With reference to FIG. 1, FIG. 3, and FIG. 4, during the first sub-period SP1 of the frame period F1, the driving circuit 130 may drive the plurality of pixel circuits 112 of the self-emissive display panel 110 (step S410) to display an image frame. The control circuit 120 may control the driving circuit 130 to set all pixel circuits 112 of the self-emissive display panel 110 not to emit light during the second sub-period SP2 of the frame period F1 (step S420). The control circuit 120 performs the touch detection operation on the self-emissive display panel 110 during the second sub-period SP2 (step S430).

Implementation of the "set all pixel circuits 112 of the self-emissive display panel 110 not to emit light" is not limited in this embodiment. According to design needs, in some embodiments, the control circuit 120 may control the driving circuit 130, so as to cut off a current path of the light emitting element EE in each one of the pixel circuits 112 during the second sub-period SP2. For instance, in the embodiment represented by FIG. 2, the driving circuit 130 may turn off the switch M26, so as to cut off the current path of the light emitting element EE. Alternatively, the control circuit 120 may control the driving circuit 130, so as to turn off all switch elements in each one of these pixel circuits 112 during the second sub-period SP2.

In this way, the self-emissive display panel 110 displays a black frame during the second sub-period. The display time of this black frame is excessively short and may not be easily detected by a viewer. After the second sub-period SP2 is over, the control circuit 120 controls the driving circuit 130, so that these pixel circuits 112 of the self-emissive display panel 110 resume emitting light, and that the self-emissive display panel 110 may resume displaying the image frame.

The driving circuit sets these pixel circuits 112 of the self-emissive display panel 110 not to emit light during the second sub-period SP2 (the period when the touch detection operation is performed). After the second sub-period SP2 is over, these pixel circuits 112 of the self-emissive panel 110 resume emitting light, and luminance (gray scale) of theses pixel circuits 112 is not changed by the touch detection operation. Therefore, when the control circuit 120 performs the touch detection operation on the self-emissive display panel 110, the display apparatus 100 may not affect the visual effect of the self-emissive display panel 110 as much as possible.

Implementation of these pixel circuits 112 of the self-emissive display panel 110 is not limited in the disclosure. That is, implementation of these pixel circuits 112 shown in FIG. 1 is not limited to the embodiment represented by FIG. 2.

Figure 5:
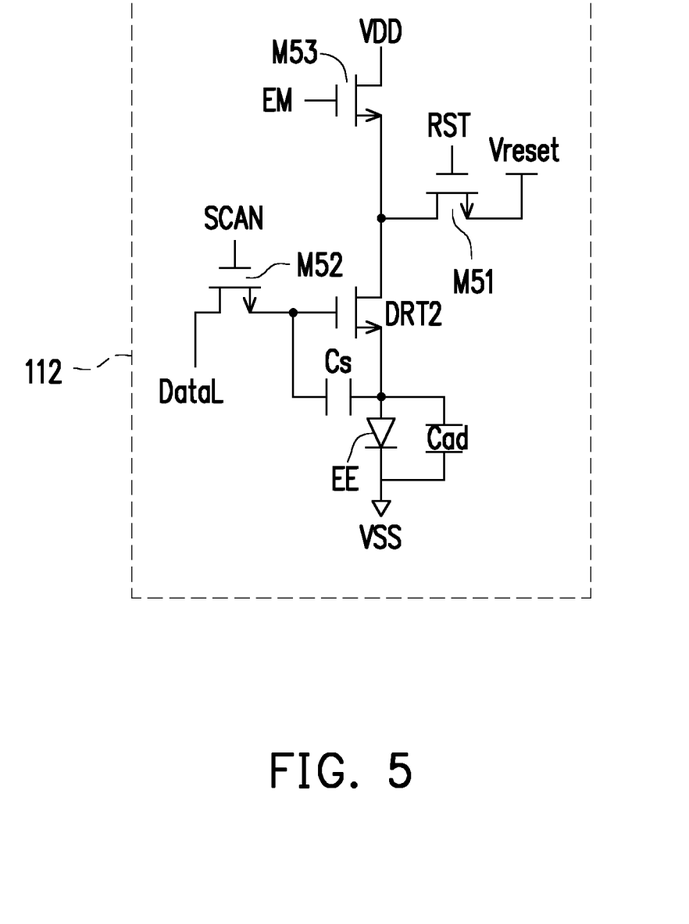
FIG. 5 is a schematic diagram of a circuit among the pixel circuits shown in FIG. 1 according to another embodiment.

FIG. 5 is a schematic diagram of a circuit among the pixel circuits 112 shown in FIG. 1 according to another embodiment. The pixel circuit 112 in FIG. 5 includes a switch M51, a switch M52, a switch M53, a transistor DRT2, a storage capacitor Cs, a storage capacitor Cad, and a light emitting element EE (e.g., an OLED). The switch M51, the switch M52, the switch M53, and the transistor DRT2 may be n-channel type (n-type) thin film transistors (TFT).

With reference to FIG. 1 and FIG. 5, the switch M51 is controlled by a reset scanning signal RST, and the reset scanning signal RST may be one of the reset scanning signals $RST_1$ to $RST_M$. The switch M52 is controlled by a gate scanning signal SCAN, and the gate scanning signal SCAN may be one of the gate driving signals $SCAN_1$ to $SCAN_M$. The switch M53 is controlled by an emissive scanning signal SCAN, and the emissive scanning signal EM may be one of the emissive scanning signals $EM_1$ to $EM_M$. Based on control performed by the reset scanning signal RST, the gate scanning signal SCAN, and the emissive scanning signal EM, a data voltage (one of the data voltages Data1 to DataX) of a data line DataL may be written into the storage capacitors Cs and Cad.

Figure 6:
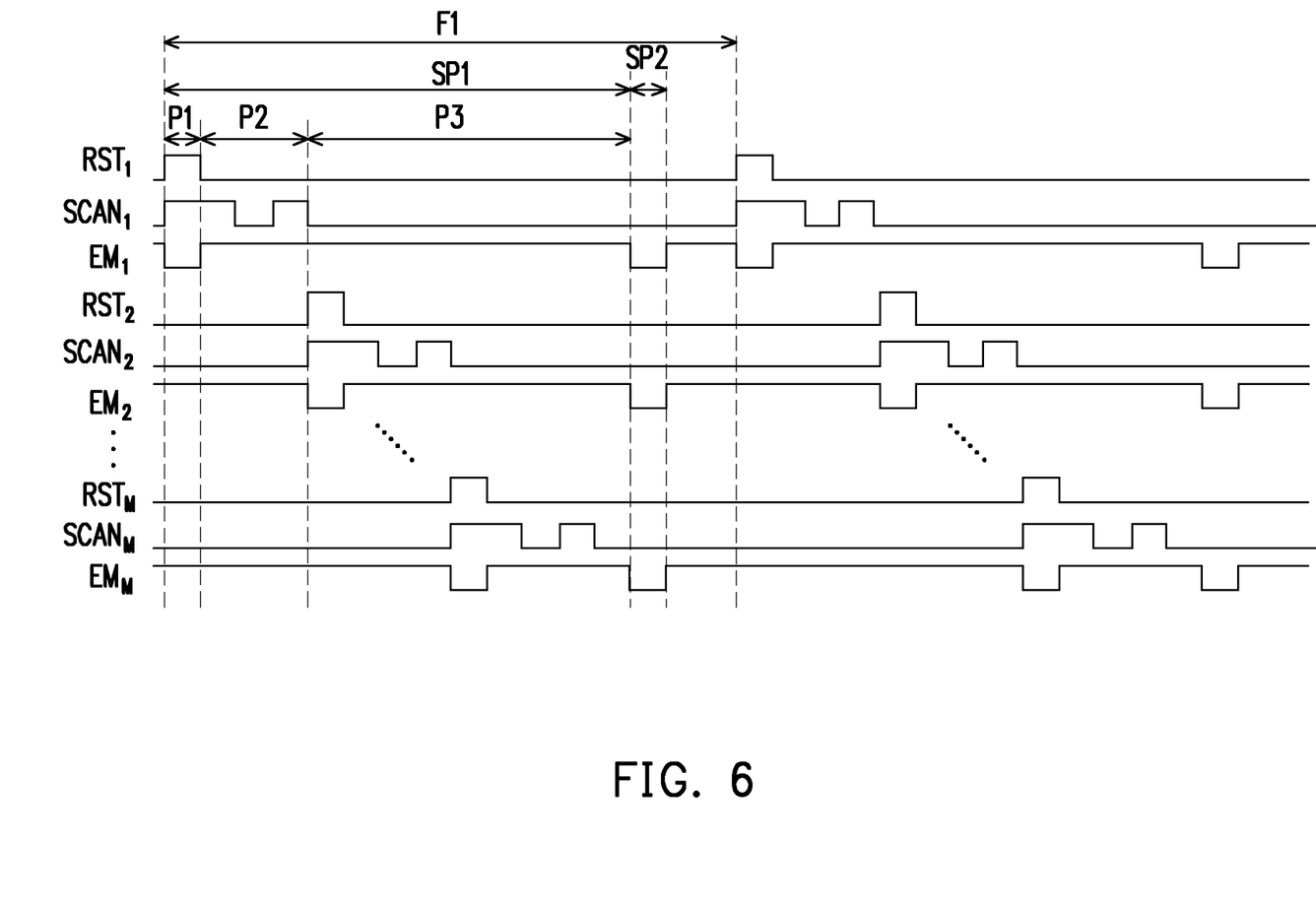
FIG. 6 is a schematic diagram of signal timing of the self-emissive display panel shown in FIG. 1 according to another embodiment of the disclosure.

FIG. 6 is a schematic diagram of signal timing of the self-emissive display panel 110 shown in FIG. 1 according to another embodiment of the disclosure. As shown in FIG. 6, one frame period F1 may at least be divided into a first sub-period SP1 and a second sub-period SP2. For the sake of description, it is assumed herein that the reset scanning signal RST shown in FIG. 5 may be the reset scanning signal $RST_1$ shown in FIG. 6, the gate scanning signal SCAN shown in FIG. 5 may be the gate scanning signal $SCAN_1$ shown in FIG. 6, and the emissive scanning signal EM shown in FIG. 5 may be the emissive scanning signal $EM_1$ shown in FIG. 6. Description of the reset scanning signals $RST_2$ to $RST_M$, the gate scanning signals $SCAN_2$ to $SCAN_M$, and the emissive scanning signals $EM_2$ to $EM_M$ shown in FIG. 6 may be deduced by analogy with reference to the description related to the reset scanning signal $RST_1$, the gate scanning signal $SCAN_1$, and the emissive scanning signal $EM_1$, so such description is not repeated herein.

Referring to FIG. 1, FIG. 5, and FIG. 6, during a period P1 (a reset stage), the reset scanning signal RST (e.g., $RST_1$) may turn on the pixel circuit 112 and the switch M51, and the gate scanning signal SCAN (e.g., $SCAN_1$) may turn on the switch M52 of the pixel circuit 112. As such, the reset voltage Vreset may be sent to the storage capacitor Cs, the storage capacitor Cad, and the light emitting element EE. During the period P1, the switch M53 is turned off. During a pixel circuit P2 (a data writing stage), the gate scanning signal SCAN (e.g., $SCAN_1$) may turn on the switch M52 of the pixel circuit 112, and the emissive scanning signal EM (e.g., $EM_1$) may turn on the switch M53 of the pixel circuit 112. At this moment, the switch M51 is turned off. In this way, the data voltage (one of the data voltages Data1 to DataX) of the data line DataL may be stored in the storage capacitors Cs and Cad. During a period P3 (a light emitting stage), the emissive scanning signal EM (e.g., $EM_1$) may turn on the switch M53 of the pixel circuit 112 (the switch M51 and the switch M52 are turned off at the moment). In this way, the switch M53 and the transistor DRT2 may provide a current path, and such current path may provide a driving current to the light emitting element EE. The data voltage stored in the storage capacitor Cs may control the transistor DRT2 to determine the driving current. The driving current passes through the light emitting element EE, so that the light emitting element EE may emit light having a corresponding luminance (gray scale).

The control circuit 120 may perform a touch detection operation on the self-emissive display panel 110 during the second sub-period SP2 of the frame period F1. For instance, during the second sub-period SP2, a system voltage line (a conductive line configure to send the system voltage VDD, not shown in FIG. 1) of the pixel array 111 may be configured to act as a TX electrode of the touch detection operation, and a reference voltage line (a conductive line configure to send the reference voltage VSS, not shown in FIG. 1) of the pixel array 111 may be configured to act as an RX electrode of the touch detection operation. In some other embodiments, the system voltage line of the pixel array 111 may be configured to act as the RX electrode of the touch detection operation, and the reference voltage line of the pixel array 111 may be configured to act as the TX electrode of the touch detection operation. When the touch detection operation is performed, the control circuit 120 changes the system voltage line of the pixel array 111 and/or a voltage of the reference voltage line.

Embodiments represented by FIG. 5 and FIG. 6 may also be applied to description related to FIG. 4. The control circuit 120 may control the driving circuit 130 to set all pixel circuits 112 of the self-emissive display panel 110 not to emit light during the second sub-period SP2 of the frame period F1. The control circuit 120 performs the touch detection operation on the self-emissive display panel 110 during the second sub-period SP2.

According to different design needs, the control circuit 120 and/or a block of the driving circuit 130 may be implemented in the form of hardware, firmware, software (i.e., a program), or a combination of the majority of the foregoing three.

In the form of hardware, the control circuit 120 and/or the block of the driving circuit 130 may be implemented in the form of a logic circuit on an integrated circuit. Related functions of the control circuit 120 and/or the driving circuit 130 may be implemented as hardware through using hardware description languages (e.g., Verilog HDL or VHDL) or other suitable programming languages. For instance, the related function of the control circuit 120 and/or the driving circuit 130 may be implemented in one or a plurality of controllers, a micro controller, a micro processor, an application-specific integrated circuit (ASIC), a digital signal processor (DSP), a field programmable gate array (FPGA), and/or various logic blocks, module, and circuits in other processing units.

In the form of software and/or firmware, the related functions of the control circuit 120 and/or the driving circuit 130 may be implemented as programming codes. For instance, the control circuit 120 and/or the driving circuit 130 may be implemented by using a general programming language (e.g., C, C++, or an assembly language) or other suitable programming languages. The programming code may be recorded/stored in a recording medium, and the recording medium includes, for example, read only memory (ROM), a storage device and/or random access memory (RAM). A computer, a central processing unit (CPU), a controller, a micro controller, or a micro processor may read and execute the programming code from the recording medium to accomplish the related functions. In terms of the recording medium, a "non-transitory computer readable medium" may be used. For instance, a tape, a disk, a card, semiconductor memory, a programmable logic circuit, etc. may be used. Further, the program may also be provided to a computer (or CPU) through any transmission medium (a communication network or a broadcast wave, etc.). The communication network includes, for example, Internet, wired communication, wireless communication, or other communication media.

In view of the foregoing, in the driving device and the operation method thereof provided by the embodiments, one frame period F1 may at least be divided into the first sub-period SP1 and the second sub-period SP2. In the first sub-period SP1 and the second sub-period SP2 of the same frame period F1, the driving device respectively performs the displaying and driving operation and the touch detection operation on the self-emissive display panel 110. Herein, the driving circuit 130 sets these pixel circuits 112 of the self-emissive display panel 110 not to emit light during the second sub-period SP2. Therefore, when the control circuit 120 performs the touch detection operation on the self-emissive display panel 110, the display apparatus 100 may not affect the visual effect of the self-emissive display panel 110 as much as possible.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driving device for a self-emissive display panel, configured to drive the self-emissive display panel, wherein the self-emissive display panel is an in-cell touch panel, and the driving device comprises:
a driving circuit, configured to drive a plurality of pixel circuits of the self-emissive display panel during a first sub-period of a frame period to display an image frame; and
a control circuit, configured to control the driving circuit to set the pixel circuits not to emit light during a second sub-period of the frame period, wherein the control circuit performs a touch detection operation on the self-emissive display panel during the second sub-period,
wherein the control circuit controls the driving circuit, so as to turn off all switch elements in each one of the pixel circuits during the second sub-period.

2. The driving device as claimed in claim 1, wherein the self-emissive display panel displays a black frame during the second sub-period, and the self-emissive display panel resumes displaying the image frame after the second sub-period is over.

3. The driving device as claimed in claim 1, wherein the control circuit controls the driving circuit, so as to set the pixel circuits to resume emitting light after the second sub-period is over.

4. The driving device as claimed in claim 1, wherein the control circuit controls the driving circuit, so as to cut off a current path in a light emitting element of each one of the pixel circuits during the second sub-period.

5. The driving device as claimed in claim 1, wherein the self-emissive display panel comprises an organic light emitting diode display panel or a micro light emitting diode display panel.

6. An operation method of a driving device for a self-emissive display panel, the driving device configured to drive the self-emissive display panel, wherein the self-emissive display panel is an in-cell touch panel, and the operation method comprises:

driving a plurality of pixel circuits of the self-emissive display panel during a first sub-period of a frame period by a driving circuit to display an image frame;

controlling the driving circuit by a control circuit to set the pixel circuits not to emit light during a second sub-period of the frame period;

performing a touch detection operation on the self-emissive display panel by the control circuit during the second sub-period; and controlling the driving circuit by the control circuit, so as to turn off all switch elements in each one of the pixel circuits during the second sub-period.

7. The operation method as claimed in claim 6, further comprising:

displaying a black frame by the self-emissive display panel during the second sub-period; and resuming displaying the image frame by the self-emissive display panel after the second sub-period is over.

8. The operation method as claimed in claim 6, further comprising:

controlling the driving circuit by the control circuit, so as to set the pixel circuits to resume emitting light after the second sub-period is over.

9. The operation method as claimed in claim 6, further comprising:

controlling the driving circuit by the control circuit, so as to cut off a current path in a light emitting element of each one of the pixel circuits during the second sub-period.

10. The operation method as claimed in claim 6, wherein the self-emissive display panel comprises an organic light emitting diode display panel or a micro light emitting diode display panel.

* * * * *